United States Patent Office 3,424,710
Patented Jan. 28, 1969

3,424,710
VULCANIZATION OF FLUOROCARBON COPOLYMERS UTILIZING SCHIFF'S BASES
Raymond G. Spain, Kettering, Ohio, assignor to the United States of America, as represented by the Secretary of the Air Force
No Drawing. Continuation-in-part of application Ser. No. 323,509, Nov. 13, 1963. This application June 13, 1967, Ser. No. 646,152
U.S. Cl. 260—41    6 Claims
Int. Cl. C08f 29/16, 45/72

ABSTRACT OF THE DISCLOSURE

A stable vulcanizable composition of matter comprising selected polymers and copolymers of hydrofluorocarbons, an azadiene or Schiff's base as a vulcanizing agent, and a lower alkyl ketone, and a method of effecting vulcanization of said composition by adding water thereto after removing all or most of the ketone.

CROSS REFERENCE TO RELATED APPLICATION

The application is a continuation-in-part of application Ser. No. 323,509, filed Nov. 13, 1963.

BACKGROUND OF THE INVENTION

Field of the invention

The present invention relates to (a) a method of vulcanization or cross-linking of a mixture containing organic compounds, particularly polymerized halogenated monoolefins, in the presence of water or of water vapor such as atmospheric moisture and to (b) the vulcanizable mixture employed therein.

Description of the prior art

With the advancement of the art, the number, sophistication and commercial availability of hydrofluorocarbon polymers has steadily increased, largely as a result of the many desirable properties exhibited by these materials. Typical of these are the homopolymers of chlorotrifluoromethylene, vinylidene fluoride and tetrafluoroethylene and copolymers of 2-chloroperfluoropropylene, chlorotrifluoroethylene, vinylidene fluoride, tetrafluoroethylene and hexafluoropropene.

While the vulcanization or cross-linking of the above perfluorocarbons has long been regarded as extremely difficult to achieve, the prior art has provided, as catalysts or cross-linking agents, various materials such as certain diamines, the carbamates of diamines, the salts of polyfunctional amines and amine oxides, the salt derivatives thereof and the hydrates of both. Illustrative of such catalysts are U.S. Patent No. 3,071,565 to Davis et al. and U.S. Patent No. 2,979,490 to West. With respect to all of these vulcanizing or cross-linking agents, it has generally been conceded that the optimum mechanical properties that might potentially be enjoyed in such hydrofluorocarbons have not been achieved. Moreover, the incorporation of the vulcanizing agent in the polymer has been complicated by the fact that the vulcanizing reaction tends to take place during the blending of the ingredients, and deleterious scorching occurs.

A further disadvantage of the vulcanizable mixtures of hydrofluorocarbons according to the prior art has been their very limited stability or gel time with the result that the mixtures have had very little or no shelf life. This problem has been particularly troublesome in the case of cast films or thin applications of the hydrofluorocarbons in that the rapidity of the vulcanization or cross-linking has not allowed sufficient time for fabrication or application with the result that the use of hydrofluorocarbons, and particularly the hydrofluorocarbon elastomers, as films or coatings, has been practically abandoned as have many other potential applications of this material.

While the prior art has also revealed vulcanizing agents which are relatively stable on admixture with solutions of hydrofluorocarbon elastomers, the desired effect of vulcanization is induced only on exposure of the deposited coatings to elevated temperatures (ca. 300–400° F.). The necessity of using elevated temperatures to achieve vulcanization of these fluorocarbon mixtures is a definite handicap wherein the coated item is large, such as the integral fuel tanks of aircraft or the coating of large tanks with hydrofluorocarbon polymers to obtain improved resistance to corrosive chemicals.

SUMMARY OF THE INVENTION

The present invention is directed to (a) specific vulcanizable compositions which have a substantial shelf life, and to (b) a method of effecting vulcanization of these compositions as desired.

More specifically, the compositions contain at least (1) a vulcanizable hydrofluorocarbon homopolymer, such as chlorotrifluoromethylene and/or copolymer, such as vinylidene fluoride and hexafluoropropylene, (2) an azadiene such as a Schiff base, which in the presence of water, acts as vulcanizing agent, and (3) a lower alkyl ketone as a vulcanization inhibitor. Other components may be present in the compositions, including reenforcing agents such as carbon black and stabilizing agents such as magnesium oxide.

The method of vulcanizing these compositions consists of the steps of substantially removing the ketone and thereafter adding water. Normal atmospheric moisture may also serve as the source of the water.

In brief, the present invention provides formulations which can be stored for long periods of time. However, when ready for use, they can be vulcanized to produce, for example, films which have very high tensile strengths.

DESCRIPTION OF THE PREFERRED EMBODIMENTS

To effect the present invention and to achieve the advantages herein disclosed, it is essential that there be employed as the vulcanizing or cross-linking agent a material, such as an azadiene or Schiff's base, capable of reacting with water or water vapor to form diamines or other substances which subsequently will react with and vulcanize the hydrofluorocarbon but which may be so controlled that the diamine-forming water reaction can be delayed for a predetermined desired interval of time, for example, to allow for prolonged storage of the mixture or to allow sufficient fabrication time in the application thereof.

Such a vulcanizing agent may be admixed with the polymer at relatively low temperatures and in a relatively dry environment so that the diamine formation will not take place during such mixing and there will be no danger of premature vulcanization. When vulcanization is subsequently desired, the vulcanizing diamine formation may then be easily instituted by the simple expedient of adding water to the mixture. In many cases, particularly where the mixture is to be employed as a film or coating, it is necessary only that the mixture be exposed to the water vapor normally present in the atmosphere, and the vulcanization can be completed over a period of time at even room temperatures. Where thicker portions of the hydrofluorocarbon polymer mixture are desired to be vulcanized, water may, at some point subsequent to the mixing of the polymer and the vulcanizing agent, be added. Even after the exposure of the polymer-vulcanizing-agent-mixture to water, however, the vulcanization may still be delayed where desired by a further step to be hereinafter described.

The materials which have been found to lend themselves to the substance of the present invention as the vulcanizing agents have been found to comprise the azadienes, alkyl diimines or Schiff's bases of the type having the formulation:

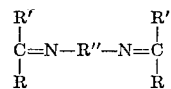

where R and R' are alkyl radicals and R" is a carbon-to-carbon group. Experimentation has disclosed that more highly reactive azadienes or diimines and, presumably because of this, improved physical properties in the vulcanizate, are achieved where each of the radicals R' and R" comprises not more than from 4 to 6 primary carbon atoms. In the formula shown, particularly improved results have been achieved where R is a methyl radical, R' is an isobutyl radical and R" is an ethylene, butylene, amylene, or hexene radical. Representative of these azadienes are the following:

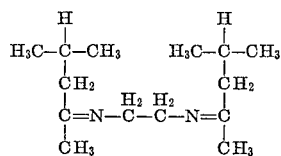

2,4,9,11-tetramethyl-5,8-diaza-4,8-dodecadiene

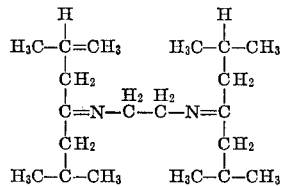

2,11-dimethyl-4,9-bis(2-methylpropyl)-5,8-diaza-4,8-dodecadiene

Where the azadiene containing formulation is applied in thick sections, for example, as filleting sealants, it has been found that optimum vulcanization depends upon a thorough diffusion of moisture throughout the entire thickness. Whereas reliance upon atmospheric moisture might require an excessive time period in which the surfaces might become vulcanized prior to the central portions, thereby seriously retarding, if not completely impeding, the vulcanization of these central portions, it has been found that the desired presence of moisture throughout the entire cross-section may be achieved and expedited and the vulcanization reaction controlled by the addition of water to the formulation along with a lower alkyl ketone as a solvent. Whereas the addition of water to the formulation immediately tends to the formation of free diamine which will cause cross-linking of the polymer, the presence of the ketone in the solvent tends to prevent such diamine formation from the imine. With the free diamine formation thus retarded so long as the ketone is present in the formulation, the same stability may be gained even with the water admixed therein until such time as the ketone is free to volatilize as upon the application of the coating. Depending upon the amount of ketone solvent employed and the ambient volatilizing conditions, the water-containing formulations dispersed in a ketone solvent have remained workable in excess of 40 days at room temperature and for much longer periods where volatilization of the ketone is prevented as, for example, where the formulation is kept in airtight containers.

The reaction control as above described is demonstrated by the following equation:

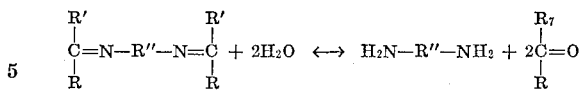

This equation being reversible, it can be seen that the addition of water to the formulation shifts the equation to the right toward the formation of free diamine and the cross-linking of the polymer. So long as the ketone is present in the formulation, the reaction tends to be shifted to the left toward the azadienes or diimines. An equilibrium or balance (see above equation) is maintained for so long as both water and ketone remain in the formulation. Since the ketone is more volatile, the formulation may be stored for prolonged periods of time under non-volatilizing conditions as in an air-tight container but then, upon exposure to atmosphere, may undergo vulcanization almost immediately where only a small amount of the ketone is present to be evaporated.

Demonstrative of the improved stability and mechanical properties of fluorocarbon polymers, prepared and vulcanized according to the present invention, are the results achieved from the following examples:

EXAMPLE A

| Component: | Parts by weight |
|---|---|
| Copolymer of vinylidene fluoride and hexafluoropropylene (Vitron A sold by Du Pont) | 100.0 |
| Carbon black | 20.0 |
| Magnesium oxide | 15.0 |
| Ethylene diamine-carbamate | 0.8 |
| Methylethyl ketone (as a solvent) | 540.0 |

EXAMPLE B

| Component: | Parts by weight |
|---|---|
| Copolymer of vinylidene fluoride and hexafluoropropylene (Viton A sold by Du Pont) | 100.0 |
| Carbon black | 20.0 |
| Magnesium oxide | 15.0 |
| Hexamethylene diamine-carbamate | 1.0 |
| Methylethyl ketone (as a solvent) | 540.0 |

EXAMPLE C

| Component: | Parts by weight |
|---|---|
| Copolymer of vinylidene fluoride and hexafluoropropylene (Viton A sold by Du Pont) | 100.0 |
| Carbon black | 20.0 |
| Magnesium oxide | 15.0 |
| Methylethyl ketone (as a solvent) | 540.0 |
| 2,4,9,11 - tetramethyl - 5,8 - diazo-4,8-dodecadiene | 4.0 |

The gel time for the above formulations admixed at room temperatures without addition of water but exposed to normal atmospheric humidity was found to be 14 days as to Example A, 5 days as to Example B and greater than 60 days for Example C. It is thus demonstrated that the stability of the coating solution containing the azadiene is greater by far than those containing the diamine-carbamates.

Cast films .010 inch thick of the above examples after exposure to normal atmospheric humidity for 7 days at 75° F. were found to have a tensile strength of 1,000 pounds per square inch in the case of Example B and of 1,700 pounds per square inch in the case of Example C, Example A having failed to cure. It is also apparent that the tensile strengths developed by case films subsequently exposed to the atmosphere is much greater where the coating solution contains a diimine or azadiene instead of a diamine carbamate. In summary, the formulations of the present invention are therefore considerably more stable when not in contact with moisture and provide yet substantially greater mechanical properties upon exposure to moisture.

In the case of the azadiene containing Example C, it can be observed that more than the fabrication time that would be normally required for almost any manner of use of the vulcanizable mixture is provided by the sixty-day gel time. According to the teachings of this invention, however, any disadvantage encountered by this prolonged delay in the vulcanizing reaction may be readily overcome by the simple expedient of reducing the amount of ketone solvents present in the formulation. Because the vulcanizing reaction will be inhibited until all of the ketone has evaporated, and because the evaporation of the ketone will depend upon a variety of circumstances such as ambient temperature, relative humidity, surface exposure and the like, the desired time delay may be established by appropriate adjustment of the amount of ketone employed pursuant to experience gained in a particular curing environment.

While the vulcanizates of the hydrofluorocarbons as discussed above have improved physical properties when vulcanization has taken place at relatively low temperatures as, for example, at room temperatures over a relatively longer period of time on the order of hours or days, it has also been found that even greater mechanical properties can be achieved in vulcanizates of such formulations where the vulcanization takes place at an increased rate under exposure to temperatures of up to 300° F.

The foregoing detailed description including specific reference to certain preferred embodiments thereof has been for the clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows.

I claim:

1. A vulcanizable composition of matter of the following composition:

| Component— | Parts by weight |
|---|---|
| Copolymer of vinylidene fluoride and hexafluoropropylene | 100 |
| Carbon black | 20 |
| Magnesium oxide | 15 |
| Methylethyl ketone | 540 |
| 2,4,9,11-tetramethyl-5,8 - diaza - 4,8 - dodecadiene | 4 |

2. A vulcanizable composition of matter of the following composition:

| Component— | Parts by weight |
|---|---|
| Copolymer of vinilidene fluoride and hexafluoropropylene | 100 |
| Carbon black | 20 |
| Magnesium oxide | 15 |
| Methylethyl ketone | 540 |
| 2,11 - dimethyl-4,9-bis(2-methylpropyl)-5,8-diaza-4,8-dodecadiene | 4 |

3. The method of vulcanizing a composiiton containing:

| Component— | Parts by weight |
|---|---|
| Copolymer of vinylidene fluoride and hexafluoropropylene | 100 |
| Carbon black | 20 |
| Magnesium oxide | 15 |
| Methylethyl ketone | 540 |
| 2,4,9,11 - tetramethyl - 5,8 - diaza - 4,8-dodecadiene | 4 | comprising the steps of (1) mixing the said copolymer with the said dodecadiene (2) volatilizing the ketone and thereafter (3) exposing the composition remaining to normal atmospheric humidity at room temperatures to effect vulcanization and curing of said composition.

4. The method of claim 3 comprising (1) adding water to said composition (2) volatilizing said ketone so as to permit the water to hydrolyze the said dodecadiene to an amine to initiate vulcanization of the composition (3) vulcanizing said composition from room temperature to 300 F.

5. The method of vulcanizing a composition containing:

| Component— | Parts by weight |
|---|---|
| Copolymer of vinylidene fluoride and hexafluoropropylene | 100 |
| Carbon black | 20 |
| Magnesium oxide | 15 |
| Methylethyl ketone | 540 |
| 2,11 - dimethyl - 4,9 - bis(2-methylpropyl)-5,8-diaza-4,8-dodecadiene | 4 |

6. The method of claim 5 comprising (1) adding water to said composition (2) volatilizing said ketone so as to permit the water to hydrolyze the said dodecadiene to an amine to initiate vulcanization of the composition (3) vulcanizing said composition from room temperature to 300° F.

References Cited

UNITED STATES PATENTS 2,979,490  3/1961  West _____ 260—87.5
3,071,565  1/1963  Davis et al. _____ 260—77.5

OTHER REFERENCES

An Outline of Organic Nitrogen Compound, Degering.

MORRIS LIEBMAN, Primary Examiner.

H. S. KAPLAN, Assistant Examiner.

U.S. Cl. X.R.

260—87.7